INVENTORS
WILLIAM C. WEHNER
LOUIS P. FISTER
Burton & Parker
ATTORNEYS

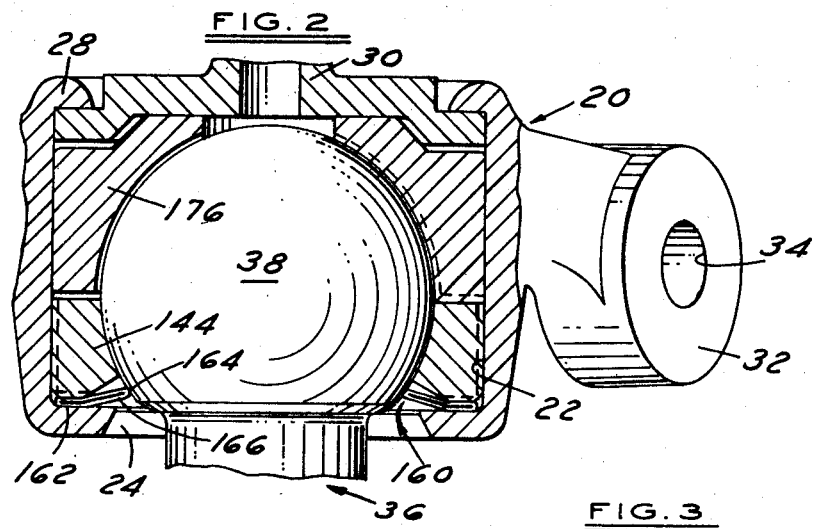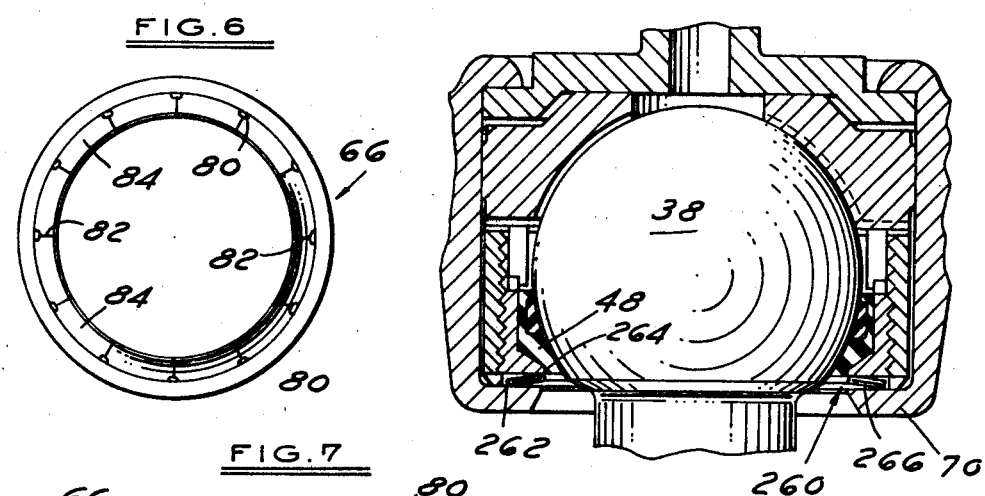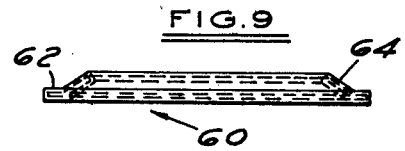

United States Patent Office 3,497,247
Patented Feb. 24, 1970

3,497,247
SWIVEL JOINT SEAL AND METHOD
OF MAKING SAME
Louis P. Fister, 410 Lake Ave., St. Louis, Mo. 63108,
and William C. Wehner, 14891 Grandville, Detroit,
Mich. 48223
Filed May 1, 1968, Ser. No. 725,838
Int. Cl. F16c 11/06; F16j 15/32
U.S. Cl. 287—87                                     10 Claims

ABSTRACT OF THE DISCLOSURE

This disclosure relates to a resilient seal for swivel joints, and the like, and a method of making the improved seal. According to one embodiment disclosed herein, the seal is in the form of a truncated annular cone having a resilient core and an elastic coating. According to another embodiment, the seal includes a peripheral radial flange which is integral with the annular cone. The conical portion of the seal may be provided with a plurality of radially extending slits in the resilient core, which extend through the inner edge of the core to permit flexing of the seal. The seal encircles the stud of the swivel joint, and may be tensioned between opposed internal walls of the housing chamber, or it may be tensioned between the stud head, within the chamber, and a wall of the housing.

The method of making a sealing means disclosed herein, includes providing a plurality of substantially evenly spaced holes about the axis of a resilient flat annular ring; slitting the ring from the holes through the inner edge; deforming the circular segments between the slits from the plane of the ring to form an inner frustumconical lip; and coating the ring with an elastomeric material, thereby sealing the slits and the holes.

FIELD OF THE INVENTION

The seal of our invention is especially suitable for swivel joints, such as automotive ball joints, wherein there is relative movement between the stud and the associated housing, and the joint is subject to contamination by foreign substances. The seal may also be advantageously utilized in "self-adjusting" ball joints, wherein there is relative movement between the secondary bearing and the stud head.

The co-pending United States patent application of William C. Wehner, S.N. 349,114, now United States Patent No. 3,389,928, discloses various forms of an internal seal for self-adjusting tension loaded ball joints. The seal is however formed from a single piece of plastic, without a resilient core, and is intended to seal only the working portion of the mechanical adjustment means. A boot or dust cover may therefore be required as shown in FIGURE 18.

DESCRIPTION OF THE PRIOR ART

Seals for swivel joints may generally be divided into two classifications; internal "packing rings" or O-rings, and external dust covers or rubber "boots." The packing ring or O-ring is generally not considered satisfactory for ball joints, wherein the stud moves in more than one axis, because the packing ring will inhibit movement of the stud perpendicular to the axis of the stud. United States Patent 2,048,803 is cited as an example of a packing ring seal in a swivel joint.

The following United States patents illustrate various forms of the more conventional external dust cover or boot: 2,110,561, 2,115,087, 2,456,546, 2,569,823, 2,452,-352, 2,954,993.

United States Patent 2,456,546 discloses an external ball joint seal having a stamped metal insert adapted to increase the "wearability" of the seal, and does not provide the advantages of the seal of our invention.

SUMMARY OF THE INVENTION

One embodiment of the sealing means of our invention includes a flat annular ring, and a frustoconical lip extending from the inner edge of the ring toward the common axis of the ring in the lip. The frustoconical lip has a resilient core and an elastic nonmetal outer coating. The flat ring may also have a resilient core, and the core of the lip may be provided with a series of slits through the inner edge thereof to allow full flexing relative to the ring. The seal is adapted to encircle the stud of a swivel joint, such as a ball joint, wherein the lip is tensioned between opposed surfaces in the housing chamber; such as between the secondary bearing and a wall of the housing, or between the head of the stud and an opposed housing wall.

According to another embodiment of our invention, the swivel joint has a seal in the form of a truncated annular cone having a resilient metal core, and an elastic coating. The seal encircles the stud within the housing, adjacent the opening in the housing chamber through which the stud shank extends, and is tensioned between opposed surfaces within the housing chamber. The seal may be tensioned between the wall of the housing adjacent the open end of the chamber and a relatively movable secondary bearing element. In this case, the seal will "follow" the secondary bearing to maintain sealing engagement.

The seal of either embodiment will flex sufficiently to allow for movement of the stud, and variations in the tolerances of the machined surfaces. Further, the inwardly extending conical configuration of the seal will permit "flushing" of the joint, while inhibiting entry of foreign material. The seal will flex toward its axis to permit grease and contaminants to pass out of the joint, but is relatively inflexible in the opposite direction. Thus, the seal will permit contaminants and spent lubricant to be flushed past the seal, from "above" the seal, and will reseal to prevent entry of water and other harmful contaminants from the open end of the chamber. The sealing edges of the seal are tensioned against the opposed surfaces, to provide a "point" contact, in cross section, which provides a very effective seal for water and other foreign material.

The method of making a resilient sealing means of our invention includes the steps of: providing a plurality of holes about the axis of a resilient flat annular ring; slitting the ring from the holes though the inner edge of the annular ring; deforming the circular segments defined between the slits, from the plane of the ring, to form an inner frustoconical annular lip; and coating the ring with an elastomeric material, thereby sealing the holes and the slits to provide a continuous annular lip.

The holes may be provided by punching a plurality of holes generally equidistant about the axis of the ring, and the holes may be formed in a continuous process with the slits. The ring may be coated by dipping the ring in an elastomeric material, such as synthetic rubber, while in the fluid state.

Other objects, advantages, and meritorious features of this invention will more fully appear from the following specification, claims, and accompanying drawings, wherein:

BRIEF DESCRIPTION OF THE DRAWINGS

FIGURE 2 is a partial side cross sectional view of another embodiment of a ball joint employing the sealing means of this invention;

FIGURE 3 is a partial side cross sectional view of another embodiment of our invention;

FIGURE 6 is a top elevation of the ring shown in FIGURE 5, after the circular segments defined between the slits have been deformed from the plane of the ring;

FIGURE 7 is a side view of the ring shown in FIGURE 6;

FIGURE 8 is a top elevation of the ring shown in FIGURE 7, after coating of the ring with an elastomeric material;

FIGURE 9 is a side elevation of the seal shown in FIGURE 8; and

DESCRIPTION OF THE PREFERRED EMBODIMENTS

Figure 1:
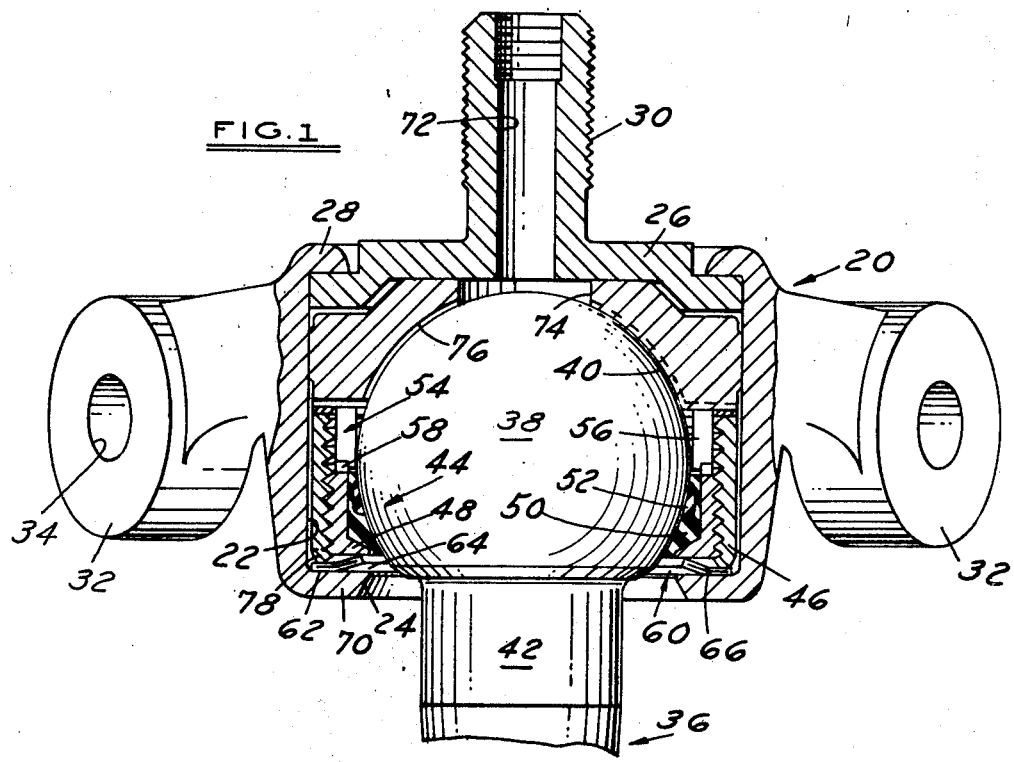
FIGURE 1 is a side, partially cross sectional view, of a self-adjusting ball joint including the sealing means of this invention.

The ball joint shown in FIGURE 1 includes a housing 20 defining a ball stud receiving chamber 22 having an open end 24. The opposite end of the chamber is closed by a cover 26, which is spun in place at 28 after assembly. The cover is provided with a threaded boss 30 adapted to receive lubricant for the joint, and the housing is provided with a pair of angularly related "ears" 32, having apertures 34 for bolting the assembly to another structural member, such as an automotive A frame. The ball stud 36 has a head portion 38 received in the housing chamber 22, in bearing engagement with the spherical surface of the primary bearing 40. The shank portion 42 of the ball stud extends out of the housing chamber through the opening 24.

The secondary bearing means, indicated generally at 44, is self-adjusting in this embodiment to eliminate destructive spacing between the ball head 38 and the primary bearing 40, thereby permitting compensation for wear. The adjustable bearing in this embodiment includes an annular stationary female jackscrew member 46, a relatively moveable male threaded jackscrew member 48 having a plastic bearing insert 50 and an O-ring 52, and a ratchet means 54. The ratchet means is fixed relative to the housing and has a plurality of resilient fingers 56 which engage teeth 58 on the movable jackscrew member 48. The ratchet means 54 permits unidirectional threaded motion of the male member 48, toward the primary bearing 40, upon relative movement of the stud 36.

The sealing means 60, of this embodiment, includes a flat annular ring 62, and a frustoconical annular lip 64 extending from the inner edge of the ring generally toward the common axis of the ring and the lip. The sealing means has a resilient core 66, and an elastomeric coating described hereinbelow. The outer edge of the flat ring portion 62 overlies the inner surface of the housing wall 70 and is restrained beneath the stationary female jackscrew member 46. The opposite conical end of the seal is tensioned against the movable jackscrew member 48, to establish a "point" or edge contact which seals the housing chamber opening 24 against the entry of foreign matter. The tensioned engagement of the seal also permits the conical lip portion 64 to "follow" movement of the jackscrew member 48 and assure sealing engagement during and after adjustment by the secondary bearing.

Ball joints must be periodically lubricated and flushed by injecting grease under pressure through a fitting provided for this purpose. In this embodiment, the boss 30 is provided with a grease opening 72. Grease is injected under pressure through the opening 74 in the primary bearing 40, around the ball head through grooves 76 in the primary bearing, and between the stationary jackscrew 46 and the housing chamber wall. The pressure of the grease forces the grease through opening 78 in the lower end of the stationary jackscrew member 46, forcing the flexible lip 64 of the seal downwardly, permitting flushing of the joint. When the pressure is relieved, the lip returns to sealing engagement with the movable jackscrew member 48, preventing entry of foreign matter. In the preferred embodiment, described hereinbelow, the resilient core 66 of the lip portion has a plurality of radially extending slits which permit full flexing of the lip to the plane of the ring 62, thereby preventing permanent deformation of the lip during assembly, or flushing of the ball joint.

FIGURE 2 illustrates another embodiment of the seal of our invention in combination with a "nonadjustable" ball joint. The housing 20 of the ball joint may be identical to the ball joint housing shown in FIGURE 1, and has been numbered accordingly. The primary bearing 176, which receives the head portion 38 of the stud, bearingly engages the stud head, and the secondary bearing 144 engages the opposed portion of the stud.

The sealing means 160, in this embodiment, is similar to the seal 60 shown in FIGURE 1, except that the lip portion is adapted to extend to sealingly engage the stud head. The seal includes a flat annular ring portion 162, which is entrapped in this embodiment beneath the lower end of the secondary bearing, and a frustoconical annular lip portion 164 which sealingly engages the ball head 38. The resilient core 166 of the seal tensions the lip portion against the ball head to assure sealing engagement, and permit flushing of the joint, as described hereinabove.

The ball joint shown in FIGURE 3 may be similar to the ball joint shown in FIGURE 1, and has been numbered accordingly, except that a modified embodiment of the sealing means is illustrated. In this embodiment, the seal 260 is in the form of a truncated annular cone having a resilient metal core 266 and an elastic coating, as described hereinabove. One edge 262 of the seal is tensioned by the resilient core against the inner surface of the radial wall 70 of the housing, and the opposed edge 264 is tensioned against the lower surface of the movable jackscrew member 48. The seal 260 of this embodiment is structurally similar to the frustoconical annular lip of the sealing means shown in FIGURES 1 and 2, however the sealing mechanism is somewhat different. In the sealing means shown in the previous embodiments, the peripheral edge of the seal is fixed, however in this embodiment the seal is tensioned at opposed edges, and not fixed within the housing.

Figure 4:
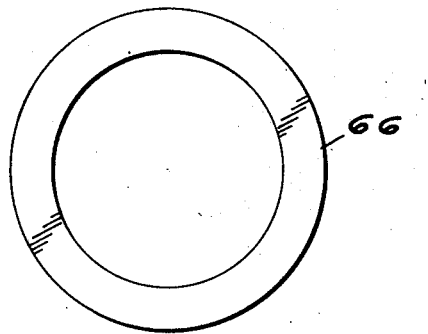
FIGURE 4 is a top elevation of a flat annular ring utlized in forming the sealing means of our invention.

FIGURES 4 to 10 illustrate steps in the method of making a resilient sealing means of our invention. FIGURE 4 illustrates a flat annular ring which is to be formed and coated according to the process of our invention. The ring is preferably resilient to provide the tensioned sealing engagement described hereinabove. A suitable material for the ring is "blue" clock spring steel having a carbon content of 0.90 to 1.00, and a Rockwell "C" hardness of 45, however other suitable materials including plastics having the requisite resiliency may be utilized.

Figure 5:
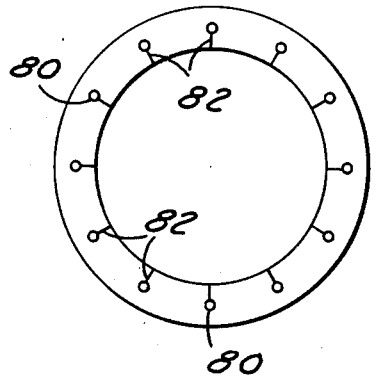
FIGURE 5 is a top elevation of the ring shown in FIGURE 4 after forming of the holes and slits.

The first step in the method of making the seal of our invention is shown in FIGURE 5, wherein a plurality of holes 80 have been provided about the axis of the ring, and the ring has been slit from the holes through the inner edge of the ring as shown at 82. The holes are preferably the same distance from the axis of the ring to provide a sealing lip having a constant height, and the holes are spaced generally equidistant about the axis of the ring for ease of manufacture. The circular segments 84 defined between the slits 82 are then deformed from the plane of the ring to form an inner frustoconical annular lip, as shown in FIGURES 6 and 7. It will be understood by those skilled in the art that the holes may be formed, the ring slit, and the center portion deformed all in a continuous operation, however this will depend upon the equipment available for the method.

Figure 10:
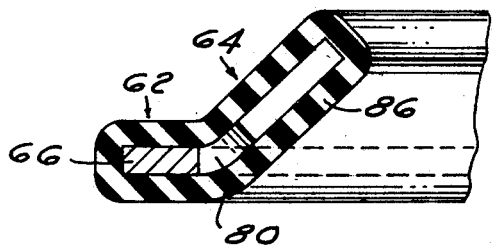
FIGURE 10 is a cross sectional view of the seal shown in FIGURE 8.

The ring is then coated with an elastic material, such as synthetic rubber, which seals the holes and the slits as shown in FIGURES 8 and 9. The lip portion 64 is now continuous, and is able to flex without permanent deformation considerably more than an unslitted ring. The cross section shown in FIGURE 10 illustrates the improved characteristics of the seal of my invention. The resilient core 66 permits the sealing lip 64 to flex without permanent deformation, and tensions the sealing lip against either the movable jackscrew member, as shown in FIGURE 1, or against the ball head as shown in FIGURE 2. The elastomeric coating 86 also compensates for irregularities and imperfections in the surfaces to be sealed, and prevents marring of the surface. The seal of our invention thus has the improved characteristics of an elastomeric seal, together with the characteristics of the more advanced resilient metal seals.

It will be understood by those skilled in the art that various modifications may be made to the embodiments illustrated and the specific details of the ball joints shown in FIGURES 1 to 3 have been shown merely to indicate the function and advantages of the disclosed embodiments of the seal of our invention, except as claimed hereinbelow.

What is claimed is:

1. A swivel joint, comprising: a housing having a stud receiving chamber and a radial flange defining an open end, a stud having a head portion received within said chamber and a shank portion extending through said open end, and an annular sealing means encircling said stud within said housing chamber at the open end, said sealing means being in the form of a truncated annular cone having a resilient metal core and an elastic coating, and said sealing means having the large end of the cone seated on said flange and the small end thereof extending inwardly into said chamber toward the head portion of said stud and away from said open end and tensioned against an adjacent surface within the housing to prevent entry of foreign matter into said chamber.

2. The swivel joint defined in claim 1, characterized in that the inner edge of said truncated annular cone engages said stud, and the periphery of said annular cone engages a wall of said housing.

3. The swivel joint defined in claim 1, characterized in that the said sealing means has a peripheral radial flange integral with the truncated annular cone which overlies an inner wall of said housing.

4. The swivel joint defined in claim 3, characterized in that the resilient core of said truncated annular cone has a plurality of slits which extend through the inner edge to permit flexing thereof.

5. The swivel joint defined in claim 3, characterized in that said radial flange of said housing at the open end of said chamber extends toward the axis of said stud, and the peripheral radial flange of said sealing means overlies said flange and said truncated annular cone is tensioned between said wall and said stud.

6. The swivel joint defined in claim 1, characterized in that said flange at the open end of the chamber extends toward the axis of said stud, and said swivel joint has a bearing means within the chamber having an end surface facing said wall, and said sealing means tensioned between the opposed surfaces of said bearing and said flange.

7. The swivel joint defined in claim 6, characterized in that said bearing means is movable relative to said housing.

8. A ball joint including a housing defining a ball stud receiving chamber having an open end, a stud having an enlarged head portion received within the chamber and a shank portion extending through the open end of the chamber, a bearing movable relative to the housing received within the chamber having a surface facing an inner wall of the housing chamber, and an annular sealing means encircling said enlarged head of the stud disposed between said bearing surface and the opposed housing wall, said sealing means in the form of a truncated annular cone having a resilient core and an elastic outer coating, and said sealing means tensioned between said bearing and the said opposed housing wall to insure sealing engagement upon relative movement therebetween.

9. The ball joint defined in claim 8, characterized in that the wall of said housing adjacent the open end of the chamber extends toward the axis of the stud, and said sealing means is tensioned between said wall and said bearing surface.

10. The ball joint defined in claim 9, characterized in that said sealing means includes an integral radially extending annular flange which overlies said inner wall of the housing, and said truncated annular cone extends toward the axis of said stud to prevent foreign matter from entering the housing while permitting fluids under pressure within the housing to flow out of said open end.

References Cited

UNITED STATES PATENTS

| | | |
|---|---|---|
| 1,729,445 | 9/1929 | Knape. |
| 2,527,787 | 10/1950 | Berger. |
| 3,007,720 | 11/1961 | Breitenstein _____ 287—87 X |
| 3,021,148 | 2/1962 | Dickinson _____ 227—235 X |
| 3,075,781 | 1/1963 | Atkinson et al. ____ 227—235 X |
| 3,086,801 | 4/1963 | Herbenar. |
| 3,262,706 | 7/1966 | Hassan. |
| 3,284,088 | 11/1966 | Pippert _____ 227—235 X |

FOREIGN PATENTS

| | | |
|---|---|---|
| 338,658 | 7/1959 | Switzerland. |
| 636,484 | 3/1962 | Italy. |

DAVID J. WILLIAMOWSKY, Primary Examiner

ANDREW V. KUNDRAT, Assistant Examiner

U.S. Cl. X.R.

308—187.1